United States Patent [19]

Masaaki et al.

[11] Patent Number: 4,864,122

[45] Date of Patent: Sep. 5, 1989

[54] JOINT INSPECTION APPARATUS FOR DETERMINING THE SIZE OF A GAP

[75] Inventors: Sakaguchi Masaaki; Kazuo Kubota, both of Odawara, Japan

[73] Assignee: Fuji Photo Film Co., Ltd., Kanagawa, Japan

[21] Appl. No.: 220,148

[22] Filed: Jul. 18, 1988

[30] Foreign Application Priority Data

Jul. 16, 1987 [JP] Japan ................... 62-177807

[51] Int. Cl.$^4$ ............................................. G01N 9/04
[52] U.S. Cl. ................... 250/223 R; 250/570
[58] Field of Search ............... 250/571, 561, 223 R, 250/570; 356/237-239, 429-431

[56] References Cited

U.S. PATENT DOCUMENTS 3,856,414 12/1974 Menary ................... 250/570
4,237,378 12/1980 Jones ................... 250/223 R
4,286,149 8/1981 Ben-Nathan et al. ........... 250/223 R
4,525,630 6/1985 Chapman ................... 250/572
4,611,907 9/1986 Inatsuki ................... 250/571

Primary Examiner—David C. Nelms
Assistant Examiner—Stephone B. Allen
Attorney, Agent, or Firm—Sughrue, Mion, Zinn, Macpeak & Seas

[57] ABSTRACT

A joint inspection apparatus comprises a light irradiating device for irradiating light to a tape joint at which two tape edge portions are joined together, and a light receiving device for receiving the light irradiated by the light irradiating device to the tape joint and passing through the tape joint or reflected by the tape joint. A judgment device is provided for judging the size of a gap between the two tape edge portions at the tape joint on the basis of information on the optical amount of the light received by the light receiving device in the vicinity of the tape joint.

5 Claims, 5 Drawing Sheets

JOINT INSPECTION APPARATUS FOR DETERMINING THE SIZE OF A GAP

BACKGROUND OF THE INVENTION

1. Field of the Invention

This invention relates to a joint inspection apparatus for automatically inspecting a gap between tape edge portions at a tape joint in the case where long tapes are joined together. This invention particularly relates to a joint inspection apparatus for detecting the size of a gap between edge portions of, for example, a leader tape and a magnetic tape at a tape joint, which gap may arise in the case where the leader tape and the magnetic tape are joined together by use of a joining tape for obtaining a video tape, an audio tape or the like.

2. Description of the Prior Art

In the course of making video tape cassettes or audio tape cassettes, a leader tape (or a trailer tape) and a magnetic tape are joined together by use of a joining tape, and the presence or absence of a gap between edge portions of the leader tape and the magnetic tape at the joint area has heretofore been judged by visual inspection by the operators.

However, with the visual inspection, criteria of judgment differ among the operators, and defective products may be missed due to fatigue of the operators. Therefore, it is not always possible to make the quality of the products uniform. Also, personnel expenses for the operators cause the product cost to increase, and the production speed is decreased by the presence of the artificial process in the production processes.

SUMMARY OF THE INVENTION

The primary object of the present invention is to provide a joint inspection apparatus for automatically detecting the size of a gap between tape edge portions at a tape joint, thereby to make the quality of tape products uniform.

Another object of the present invention is to provide a joint inspection apparatus which enables reduction in the tape product cost and an increase in the tape production speed.

The present invention provides a joint inspection apparatus comprising:

i) a light irradiating means for irradiating light to a tape joint at which two tape edge portions are joined together, ii) a light receiving means for receiving the light irradiated by said light irradiating means to said tape joint and passing through said tape joint or reflected by said tape joint, and iii) a judgment means for judging the size of a gap between said two tape edge portions at said tape joint on the basis of information on the optical amount of the light received by said light receiving means in the vicinity of said tape joint.

The term "tape joint" as used herein means the joint area formed when two tape edge portions are joined together so that the edge faces of the two tape edge portions stand facing each other.

The light receiving means may be of the type capable of receiving the light irradiated to the area in the vicinity of the tape joint, and judging whether the light impinges upon the tapes on the basis of the received optical amount. The light receiving means may be composed of, for example, a plurality of photo-transistors, a line sensor or a surface sensor. In the case where the light receiving means is composed of a line sensor extending in the tape width direction, it is necessary to move the tape joint with respect to the light irradiating means and the light receiving means in the tape length direction for sequentially obtaining the information on the optical amount in the vicinity of the tape joint. On the other hand, in the case where the light receiving means is composed of a surface sensor such as a charge coupled device (CCD) or the like, the tape joint may be maintained stationary with respect to the light irradiating means and the light receiving means. In this case, it is necessary to cause the light obtained on both sides of the tape joint to impinge upon the surface sensor simultaneously or substantially simultaneously, and then sequentially obtain the information on the optical amount over the overall surface of the surface sensor by electronic scanning.

With the joint inspection apparatus in accordance with the present invention, a gap between the tape edge portions at the tape joint is automatically measured on the basis of the information on the optical amount on both sides of the tape joint obtained by receiving the light irradiated to the tape joint and passing through the tape joint or reflected by the tape joint. Therefore, the quality of the tape products can be judged objectively and reliably by comparing the size of the gap with the predetermined reference value, and the quality of the products can be made uniform. Also, with the measurement by the automatic detection, the size of the gap between the tape edge portions at the tape joint can be judged instantaneously by the light detection and processing of the electric signals, and the production speed can be increased since the inspection efficiency is not caused to decrease by fatigue of the operators as in the case of visual inspection. Moreover, with the joint inspection apparatus in accordance with the present invention which has the simple configuration and which can be fabricated at a low cost, the tape production cost can be decreased as compared with the case where personnel expenses are required for the operators engaging in visual inspection.

DESCRIPTION OF THE PREFERRED EMBODIMENTS

The present invention will hereinbelow be described in further detail with reference to the accompanying drawings.

Figure 1:
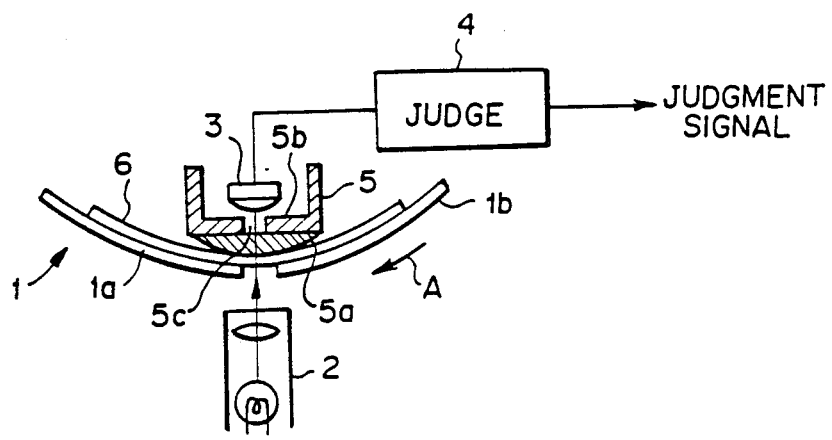
FIG. 1 is a schematic view showing an embodiment of the joint inspection apparatus in accordance with the present invention.

With reference to FIG. 1, an embodiment of the joint inspection apparatus in accordance with the present invention comprises a light irradiating means 2 for irradiating a light beam to a tape 1 moved in the direction as indicated by the arrow A between two reels (not shown), a light receiving means 3 for receiving the light beam irradiated by the light irradiating means 2 to the tape 1 and passing through the tape 1, and a judgment means 4 for measuring the size of a gap between tape edge portions of a leader tape 1a and a magnetic tape 1b at the tape joint on the basis of information on the optical amount of the light beam received by the light receiving means 3, and generating a judgment signal indicating that the product is defective in the case where the measured gap size exceeds a predetermined reference value. Also, a backup head 5 surrounds the light receiving means 3. The backup head 5 is composed of a wall member 5a formed of a light-permeable material and disposed on the tape sliding surface side, and an inner wall member 5b formed of a light-impermeable material, disposed near the light receiving means 3 and provided with a slit 5c extending in the tape width direction in the vicinity of the optical axis. Since the inner wall member 5b of the backup head 5 is provided with the slit 5c, the light beam irradiated to and passing through the tape 1 is received by the light receiving means 5 as a linear beam extending in the tape width direction.

A known motor capable of achieving constant speed movement of the tape 1 is employed as the tape movement mechanism. As the loading and unloading mechanism for the backup head 5, by way of example, a cylinder mechanism is employed.

Operations of judging the size of a gap between the tape edge portions at the tape joint by use of this embodiment will be described hereinbelow.

The two reels are rotated to move the tape 1 at a constant speed of approximately 20 mm/sec in the direction as indicated by the arrow A between the two reels. At the same time, the light beam is irradiated by the light irradiating means 2 onto the tape 1. The backup head 5 is disposed in advance to contact the tape 1 at the back of the tape area upon which the light beam impinges. The light receiving means 3 is provided so that its light receiving face receives the light beam passing through the tape 1. Also, the information on the optical amount of the light beam reflected by the tape 1 and received by the light receiving means 3 is sequentially fed as electric signals to the judgment means 4.

The tape 1 has been formed by joining the edge portion of the leader tape 1a and the edge portion of the magnetic tape 1b together by use of a joining tape 6. The edge portions of the leader tape 1a and the magnetic tape 1b have edge faces cut normal to the direction of tape movement. Therefore, in the case where the leader tape 1a and the magnetic tape 1b have been joined together accurately, the edge portions of the leader tape 1a and the magnetic tape 1b are in abutment with and continue to each other without a gap intervening therebetween. However, actually, it is not always possible to adjust the positions of the leader tape 1a and the magnetic tape 1b accurately in the course of the joining, so that the joining accuracy fluctuates and a gap is often formed between the edge portions of the leader tape 1a and magnetic tape 1b at the tape joint. A large gap present between the tape edge portions deteriorates the quality of the tape product, and therefore delivery of such a tape product to the market must be avoided.

Figure 2:
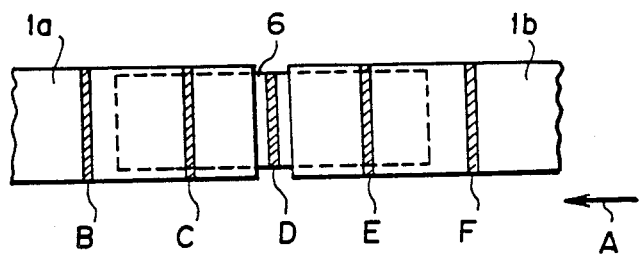
FIG. 2 is a schematic view showing irradiation of light produced by the light irradiating means to the area in the vicinity of a tape joint.

Accordingly, the aforesaid embodiment is constituted for automatically judging whether the size of the gap is or is not smaller than a predetermined reference value (70 $\mu$m or less in accordance with the EIAJ Standards), and discriminating the quality of the product. Specifically, in the course of inspection of the tape 1 having a gap between the tape edge portions as shown in FIG. 2, at the time the tape 1 is moved and a linear region B on the tape 1 arrives at the light beam irradiating position, the information on the optical amount of the light beam reflected by the linear region B is fed to the judgment means 4 via the light receiving means 3. At the time the tape 1 is further moved in the direction as indicated by the arrow A and linear regions C, D, E and F on the tape 1 sequentially arrives at the light beam irradiating position, the information on the optical amounts of the light beam reflected by the linear regions C, D, E and F is sequentially fed to the judgment means 4 via the light receiving means 3.

Figure 3:
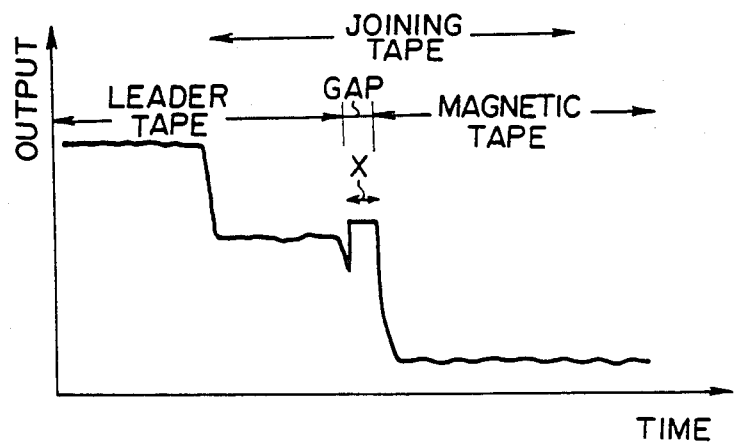
FIGS. 3, 5A, 5B and 7 are graphs showing the outputs of the light receiving means in the embodiment shown in FIG. 1.

The light receiving means 3 is composed of two light receiving elements (photodiodes, photo-transistors, photomultipliers or the like) disposed side by side in the tape width direction. The reason for this is that, with a single light receiving element, it is not always possible to judge accurately in the case where the edge portions of the leader tape 1a and the magnetic tape 1b are joined together in a "<" condition such that they overlap at a part and are spaced from each other at the other part. Therefore, in this embodiment, the outputs of the two light receiving elements are added together to obtain the output of the light receiving means 3. FIG. 3 shows a graph wherein the time is plotted on the horizontal axis and the level of the output of the light receiving means 3 is plotted on the vertical axis. As shown in FIG. 3, the optical amount of the light beam passing through the tape 1 is large at the region of the leader tape 1a alone, and decreases to approximately one half at the region where the leader tape 1a and the joining tape 6 overlap one upon the other. At the gap region (the region of the joining tape 6 alone), the optical amount of the light beam passing through the tape 1 is larger than at the region where the leader tape 1a and the joining tape 6 overlap one upon the other. At the region of the magnetic tape 1b, the optical amount of the passing light beam is markedly small. Therefore, the judgment means 4 detects the period X for which the output becomes higher at the area provided with the joining tape 6, and compares the period X with the reference value.

Figure 4:
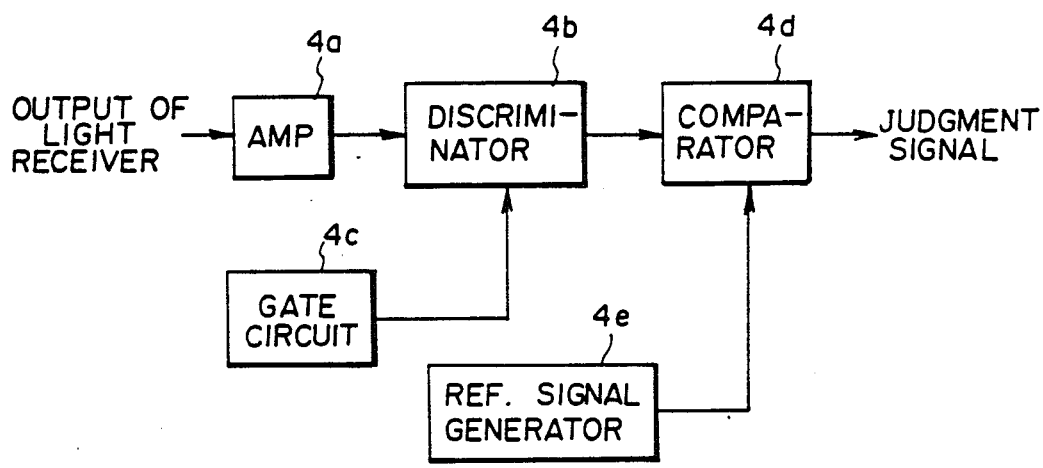
FIG. 4 is a block diagram showing the judgment means in the embodiment shown in FIG. 1, FIGS. 6A and 6B are schematic views showing the case where an air layer (bubble) is formed in the vicinity of the tape joint.
Figure 5A:
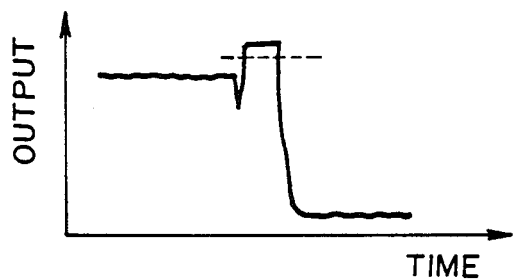
Figure 5B:

FIG. 4 is a block diagram showing the configuration of the judgment means 4 in detail. The output signal generated by the light receiving means 3 is amplified by an amplifying circuit 4a and fed to a discrimination circuit 4b. The discrimination circuit 4b generates a gap signal composed of a square wave pulse by assigning a H level to a signal of a level higher than a predetermined discrimination level. The discriminating circuit 4b sets the discrimination level as indicated by the broken line in FIG. 5A in the case where the level of the output signal representing the gap is comparatively high, and sets the discrimination level as indicated by the broken line in FIG. 5B in the case where the level of the output signal representing the gap is comparatively low. In order to facilitate the discrimination, a differentiation circuit for differentiating the output signal received from the light receiving means 3 may be provided at the stage prior to or after the amplifying circuit 4a. Also, a gate circuit 4c feeds a gate signal to the discrimination circuit 4b so that the discrimination is carried out only in the vicinity of the tape joint. The timing of gate signal feed start may be adjusted so that the gate signal is fed a predetermined period after the detection of the overlapping of the leader tape 1a upon the joining tape 6. Alternatively, the position of the tape joint may be adjusted in advance, and the gate signal may be fed after a predetermined predicted time has elapsed.

The gap signal generated by the discriminating circuit 4b is fed to a comparison circuit 4d and compared with a reference signal of a predetermined length (equivalent to 70μm in accordance with the EIAJ Standards) generated by a reference signal generating circuit 4e. The comparison circuit 4d compares the pulse length of the gap signal with the pulse length of the reference signal, outputs an OK signal as the judgment signal in the case where the pulse length of the gap signal is shorter than the pulse length of the reference signal, and outputs a NG signal as the judgment signal in the case where the pulse length of the gap signal is longer than the pulse length of the reference signal.

Figure 6A:
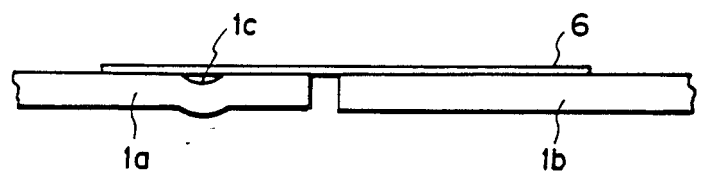
Figure 6B:
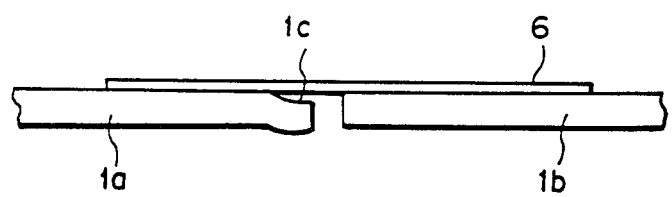
Figure 7:
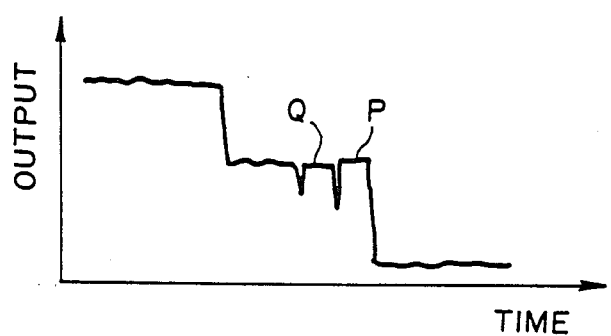
Figure 8A:
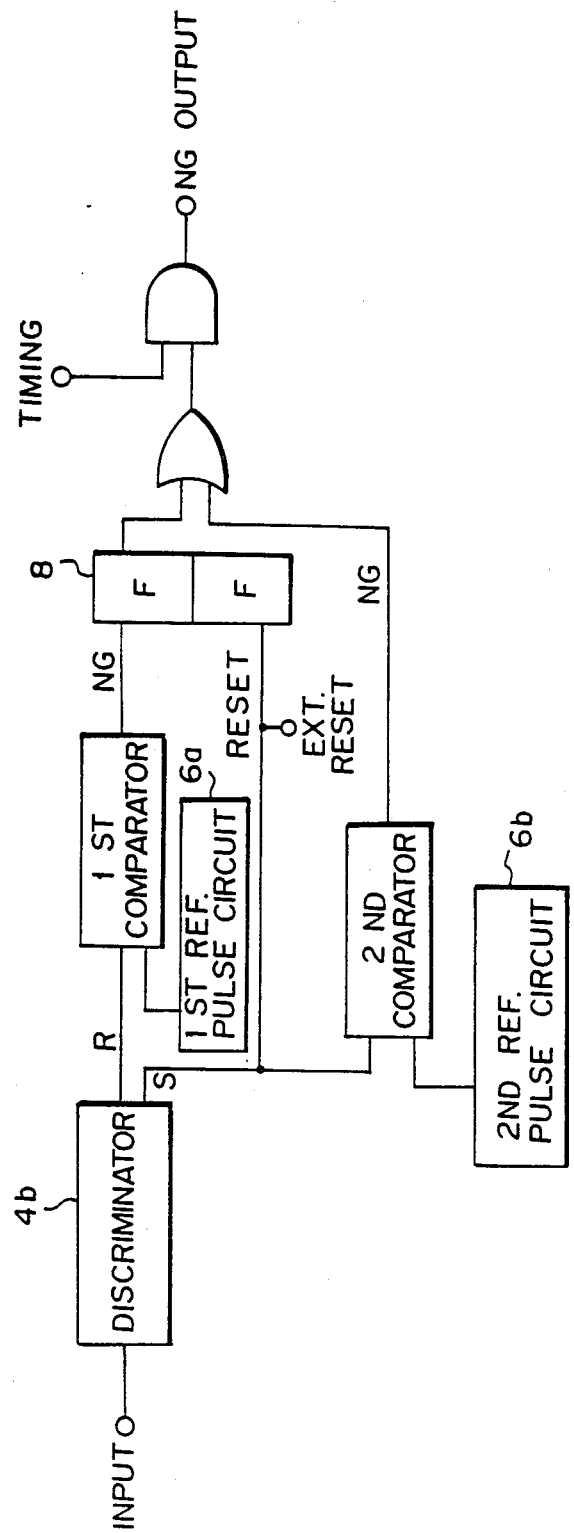
FIGS. 8A and 8B are a block diagram and a time chart showing a bubble signal cancel circuit.
Figure 8B:
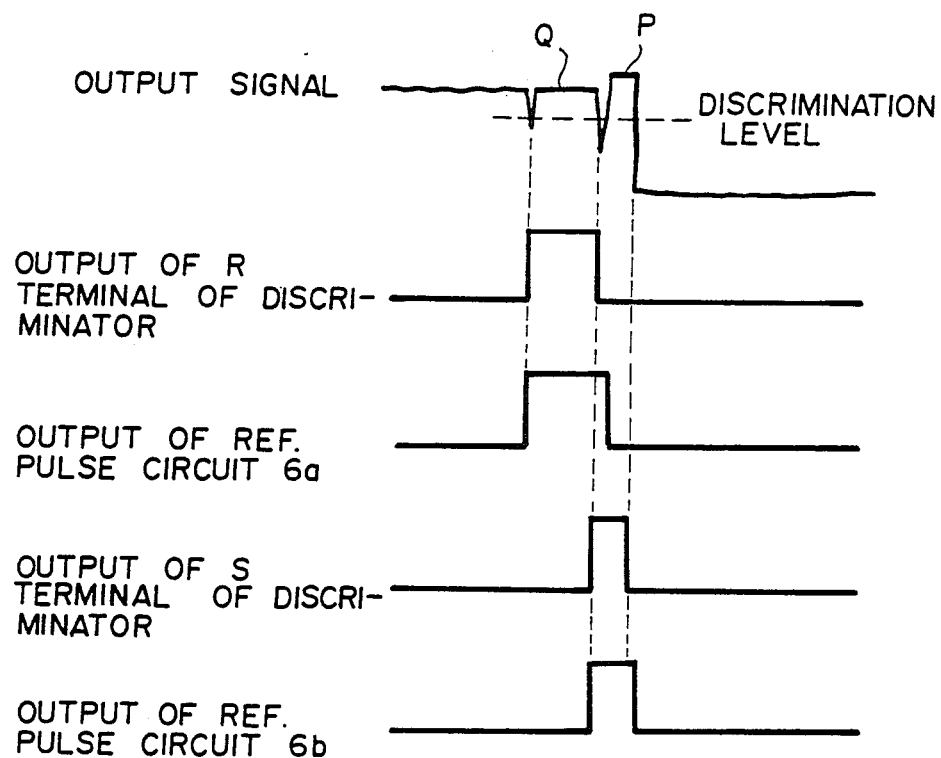

With reference to FIGS. 6A and 6B, an air layer (bubble) 1c is often formed between the leader tape 1a and the joining tape 6 in the vicinity of the edge of the leader tape 1a. In this case, as shown in FIG. 7, the output of the light receiving means 3 includes a peak Q caused by the air layer (bubble) 1c as well as a peak P representing the gap. In the case where such an output is fed to the judgment means 4, the first peak Q will be judged as a gap, and the true gap cannot be judged accurately. Accordingly, in such a case, as shown in FIG. 8A, a bubble signal cancel circuit is provided at the rear stage of the discriminating circuit 4b so that the signal period representing the true gap can be judged accurately. FIG. 8B shows a time chart of output signals generated by the components of the bubble signal cancel circuit. With reference to FIG. 8B, a square wave corresponding to the first peak Q caused by the air layer (bubble) 1c is fed out of an R terminal of the discriminating circuit 4b, and is compared with a reference pulse (equivalent to a length within the range of, for example, 100μm to 150μm) generated by a first reference pulse circuit 6a. Then, a square wave corresponding to the second peak P caused by the true gap is fed out of an S terminal of the discriminating circuit 4b, and is compared with a reference pulse (equivalent to a length of, for example, 70μm) generated by a second reference pulse circuit 6b. A flip-flop 8 sets a NG signal in the case where the result of comparison of a first output R of the discriminating circuit 4b with the output of the first reference pulse circuit 6a is not good. However, when a second output S is fed out of the discriminating circuit 4b, the NG signal set by the flip-flop 8 is reset immediately, and the final judgment is carried out based on only the result of comparison of the second output S with the output of the second reference pulse circuit 6b. In this case, the square wave corresponding to the first peak is also compared with the reference pulse to cope with the case where no peak Q representing the air layer (bubble) 1c is present and the peak P representing the true gap appears as the first peak. Stated differently, the bubble signal cancel circuit judges only the true gap as the gap by the method described below. Specifically, (1) in the case where two signal fall points are present in the output of the discriminating circuit 4b, the interval between the two signal fall points is judged as the gap. Also, (2) in the case where three signal fall points are present in the output of the discriminating circuit 4b, the first signal fall point is ignored, and the interval between the second signal fall point and the third signal fall point is judged as the gap.

In the case where the size of the true gap is zero and, at the same time, the air layer (bubble) 1c is present, only two signal fall points are present in the output signal of the discriminating circuit 4b. In this case, when the bubble signal cancel circuit judges as mentioned in (1) above and the length of the air layer (bubble) 1c is longer than the length represented by the predetermined reference signal, i.e. exceeds the range of 100 μm to 150 μm, the NG signal is fed out as the judgment signal though the OK signal should be fed out as the judgment signal. Such a problem should be eliminated even though the probability thereof is very low. For this purpose, by considering that the level of the signal fall point caused by the air layer (bubble) 1c (i.e. the first signal fall point of the output signal in FIG. 8B) and the level of the signal fall point caused by the true gap (i.e. the second signal fall point of the output signal in FIG. 8B) are different from each other, different discrimination levels are adjusted for the respective levels of the two signal fall points. In this manner, judgment can be made accurately also in the case where the size of the true gap is zero.

The judgment signal may be fed to a buzzer so that a warning is issued for a predetermined period in the case where the NG signal is generated. Also, light emitting diodes may be provided on a control panel for visibly indicating the OK signal and the NG signal generated as the judgment signal. This method is advantageous for sorting of the products.

In the aforesaid embodiment, the tape 1 and the backup head 5 are disposed so that the tape 1 slides along the backup head 5. However, they need not necessarily be disposed so that the tape 1 slides along the backup head 5.

Also, instead of irradiating the linear beam extending in the tape width direction, spot beams corresponding to the respective light receiving elements may be utilized. Also, instead of adding the outputs of the two light receiving elements to each other to obtain the output of the light receiving means 3, the outputs of the two light receiving elements may be fed independently to the discrimination circuits, and the aforesaid judgment may be carried out for each output.

In the aforesaid embodiment, the tape 1 before being housed in a cassette is inspected. However, also after the tape is housed in a cassette, inspection can be carried out in the same manner by opening and closing a guard panel.

Also, in the aforesaid embodiment, the information on the optical amount of the light beam obtained at respective regions on the tape 1 is obtained by securing the light irradiating means 2 and the light receiving means 3 and moving the tape 1. Instead, the information on the optical amount of the light beam obtained at respective regions on the tape 1 may be obtained by moving the light irradiating means 2 and the light receiving means 3 in the tape length direction. Alternatively, the light receiving means 3 may be constituted by a surface sensor such as a CCD, and the light irradiating means 2, the light receiving means 3 and the tape joint may be disposed at such positions that the light beam irradiated onto the area in the vicinity of the tape joint and reflected by said area or passing through said area simultaneously impinges upon the surface sensor. Then, the quality of the tape product may be judged in the same manner as in the aforesaid embodiment on the basis of the information on the optical amount generated by the surface sensor.

Also, a second light receiving means may be provided on the same side as the light irradiating means 2 with respect to the tape 1 so that the light beam reflected by the tape 1 impinges upon the second light receiving means, and an overlap of the two tape edge portions one upon the other at the tape joint may be detected simultaneously on the basis of the optical amount information obtained as the output of the second light receiving means.

We claim:

1. A joint inspection apparatus for determining whether or not respective tape edge portions of first and second tapes have been joined together without a gap larger than a predetermined size, the apparatus comprising:
    (i) a light irradiating means for irradiating light to a tape joint at which said respective tape edge portions should be joined together,
    (ii) a light receiving means for receiving the light irradiated by said light irradiating means to said tape joint and passing through said tape joint or reflected by said tape joint, and
    (iii) a judgement means for judging whether the presence or absence of a gap of greater than said predetermined size between said tape edge portions at said tape joint on the basis of information on the optical amount of the light received by said light receiving means in the vicinity of said tape joint.

2. An apparatus as defined in claim 1 wherein said judgment means is connected to a warning means for issuing a warning at the time the gap having a size larger than the predetermined reference size is detected.

3. An apparatus as defined in claim 1 wherein said light receiving means is adapted for reception of said light passing through different positions at said tape joint in the tape width direction or reflected by different positions at said tape joint in the tape width direction.

4. An apparatus as defined in claim 1 wherein said judgment means is provided with a means for eliminating adverse effects of an air bubble entrained in one of said tapes on the judgment.

5. An apparatus as defined in claim 1, wherein said predetermined amount is 70$\mu$m.

* * * * *